United States Patent [19]
Oliwa et al.

[11] Patent Number: 4,868,560
[45] Date of Patent: Sep. 19, 1989

[54] VOICE PAGING SYSTEM PROVIDING DEFERRED PAGING CAPABILITY

[75] Inventors: Gary A. Oliwa, Boynton Beach; Leon Jasinski, Ft. Lauderdale, both of Fla.

[73] Assignee: Motorola, Inc., Schaumburg, Ill.

[21] Appl. No.: 192,572

[22] Filed: May 11, 1988

Related U.S. Application Data

[63] Continuation-in-part of Ser. No. 181,754, Apr. 14, 1988.

[51] Int. Cl.$^4$ .............................................. H04Q 7/00
[52] U.S. Cl. ...................... 340/825.440; 340/825.480; 379/56; 455/31
[58] Field of Search ...................... 340/825.44, 825.47, 340/825.48, 311.1; 379/56, 57, 58, 59, 217; 455/31, 54, 33, 38

[56] References Cited

U.S. PATENT DOCUMENTS 4,247,908  1/1981  Lockhart, Jr. et al. .............. 455/31
4,682,148  7/1987  Ichikawa et al. ................. 340/311.1
4,796,024  1/1989  Sakoh et al. .................... 340/825.44

Primary Examiner—Donald J. Yusko
Assistant Examiner—E. O. Pudpud
Attorney, Agent, or Firm—Philip P. Macnak; Vincent B. Ingrassia

[57] ABSTRACT

A paging system is provided for transferring information to a paging receiver. The system includes a central controller having a paging controller, an encoder, and a first transmitter. The paging controller receives the information and data designating the paging receiver from an entry device. The encoder, in response to the data, generates a selective call paging signal designating the paging receiver. The selective call paging signal is transmitted to the paging receiver by the first transmitter. The paging receiver receives and decodes the selective call paging signal generating a control signal. A switching device is provided for selecting a normal and a deferred paging operating mode. In response to the control signal, a coded acknowledgment signal is generated indicating the selected paging receiver mode, and transmitted back to the paging controller by a second transmitter included in the paging receiver. A second receiver receives and detects the coded acknowledgment signal and in response to decoding the coded acknowledgment signal, the paging controller effects the transmission of the information to the paging receiver, which is stored in a memory when the paging receiver is in the deferred paging mode. When the coded acknowledgment signal indicates the paging receiver memory is full in the deferred paging operating mode, the information is stored in the central controller for transmission at a later time.

31 Claims, 14 Drawing Sheets

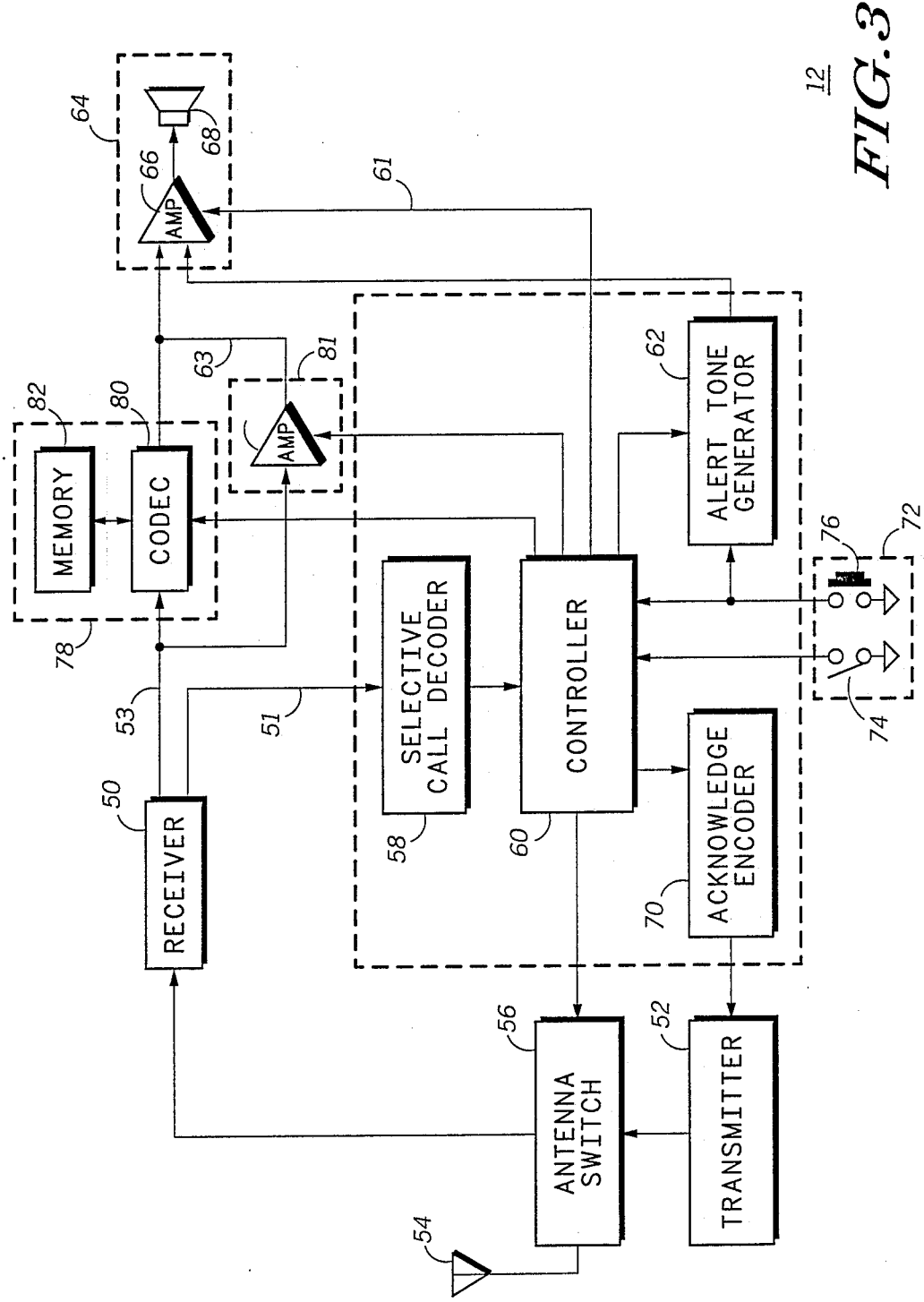

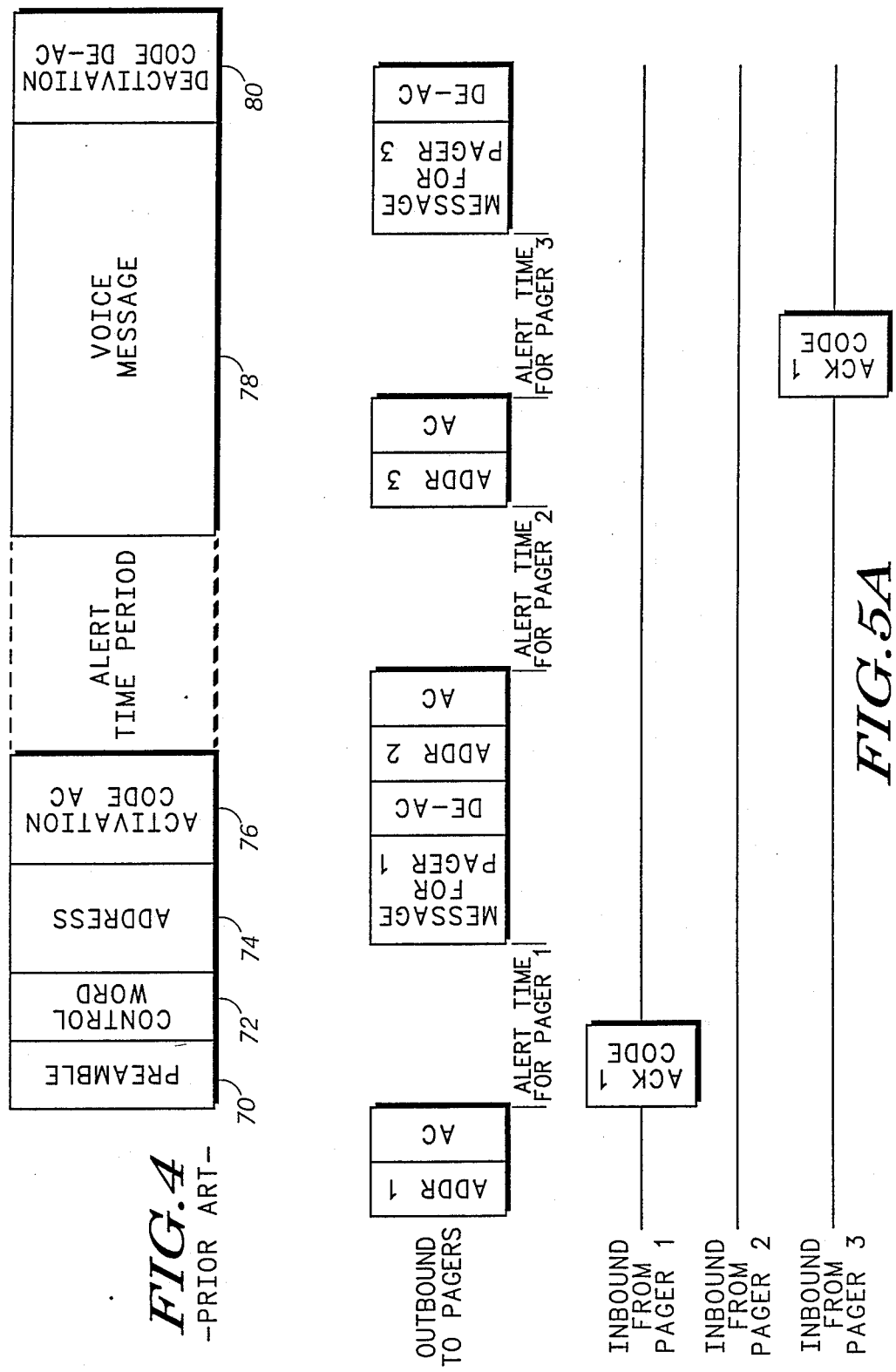

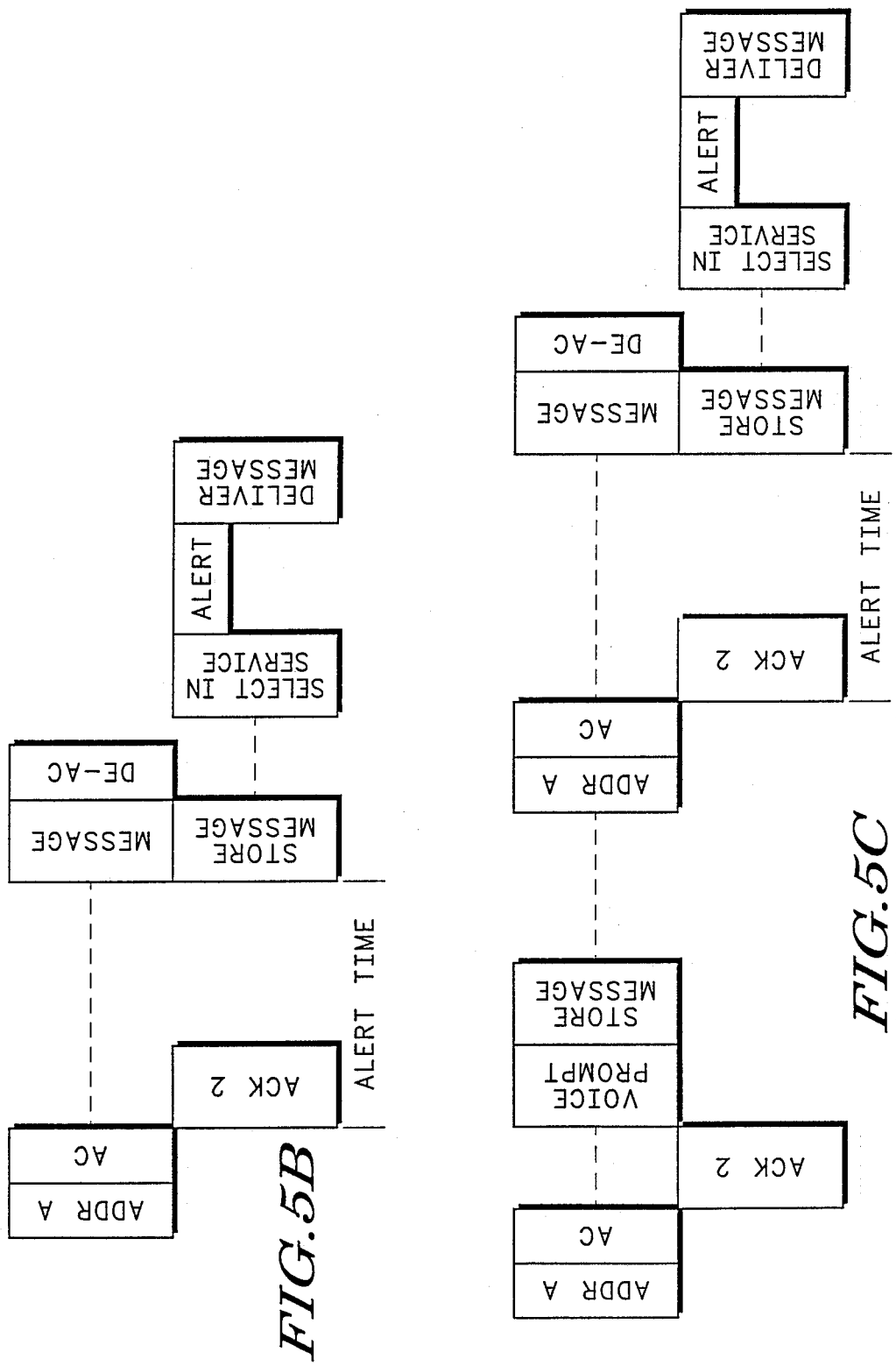

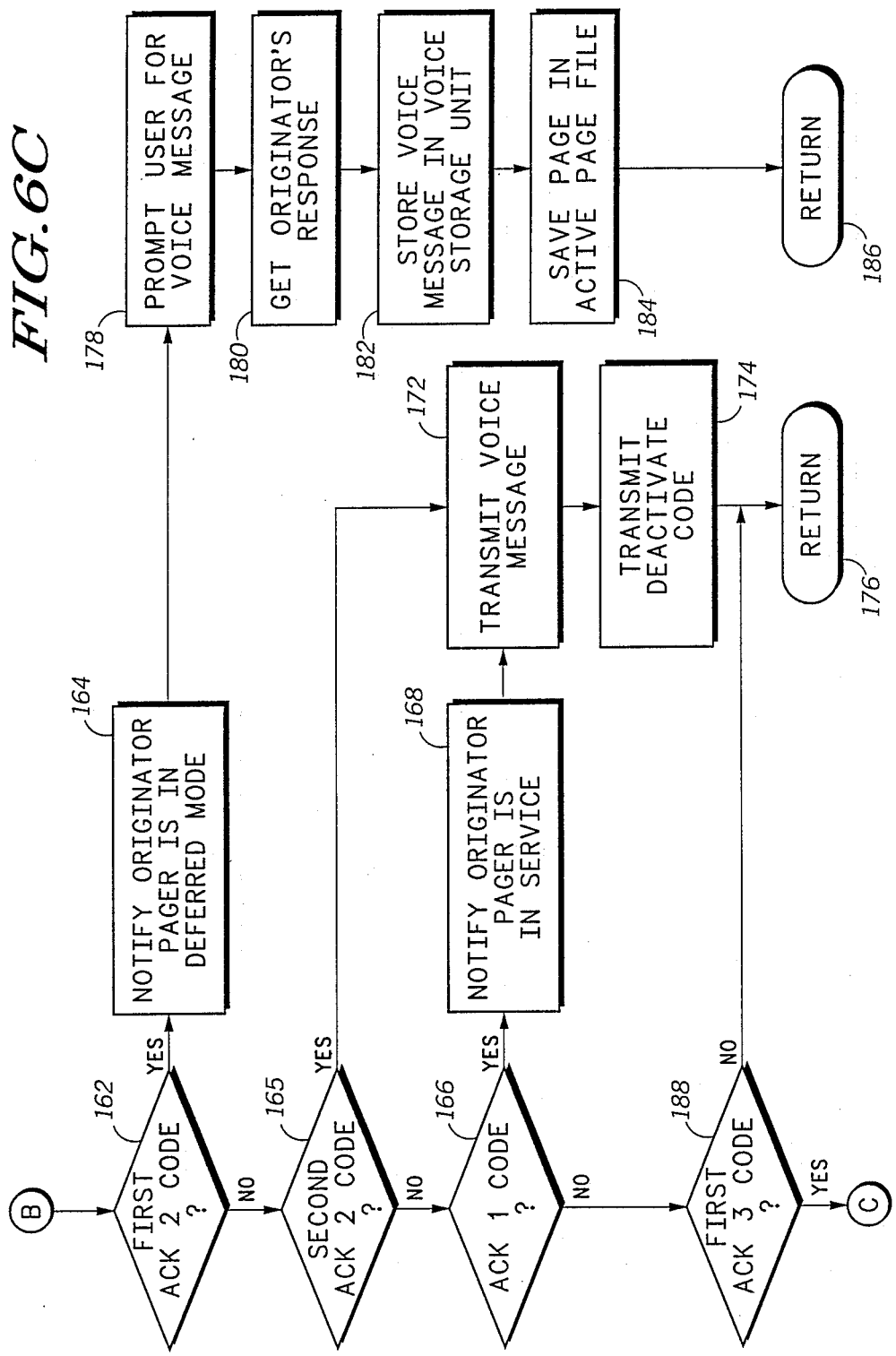

VOICE PAGING SYSTEM PROVIDING DEFERRED PAGING CAPABILITY

This application is a continuation-in-part of U.S. patent application having Ser. No. 181,754 filed Apr. 14, 1980 entitled "Paging System with Interleaved Acknowledge Back Capability" to Jasinski et al.

FIELD OF THE INVENTION

The present invention relates generally to voice paging systems and, more particularly, to a paging controller which provides an interleaved acknowledge back capability with a plurality of acknowledge back voice paging receivers having deferred paging capability

BACKGROUND OF THE INVENTION

Communications systems in general and voice paging systems in particular have attained widespread use for transmitting voice information from a central controller to a selected voice paging receiver. This use has been coupled to the rapid evolution of microcomputers which have allowed paging receivers in general to respond to control signals known as selective call paging signals that identify the type of information transmitted. This information has been transmitted using a number of well known paging coding and message formats, such as POCSAG or Golay Sequential coding (GSC) formats. As a result, the services offered to a paging receiver user have evolved from simple alert plus voice signalling to more complex voice signalling systems. Such systems are relied upon more and more to reach particular individuals wearing such paging receivers to deliver critical and important messages.

Unfortunately, it cannot always be guaranteed that such messages for a particular pager will in fact be received when initially sent. In the past, a voice message was sent without any provision for knowing whether the paging receiver user received it as intended or not. One way to overcome this problem has been to request the paging receiver user to call back the originator of the voice message on the telephone to so advise him. To overcome the annoyance of the paging receiver user calling back the originator, more complex paging systems and paging receivers have begun to use acknowledgment signals. Basically, in response to the selective call paging signals from the central controller, the paging receiver transmits back an acknowledgment signal ("ack-back") that the information has been received.

The above, of course, provides a substantial step toward assuring confidence in the reliability of the paging system. However, to service the acknowledgment signal from the paging receiver, the central controller must switch from a transmission mode to a receive mode and then wait for the acknowledgment signal. This procedure has wasted valuable transmission time, decreased throughput, and increased the complexity of the system. Therefore, a benefit would be obtained if the acknowledge signal from the voice paging receiver could be transmitted during a period of time when the transmitter central controller is normally inactive, such as during the paging receiver alert time. Additionally, receipt of the acknowledgment signal prior to the transmission of the voice message will eliminate wasted transmission time by preventing the transmission of the voice message to an "out of service" pager (either turned off or out of range).

However, even with the paging receiver configured to provide an acknowledgment response, this acknowledgment response was no guarantee the message received was delivered to the paging user, as can occur when the paging receiver is equipped with a user selectable deferred paging mode. When the deferred paging mode was selected, the paging user was not alerted to the receipt of the message until the deferred paging mode was exited, resulting in the loss of the contents of the message. Therefore the paging user was unable to respond to the message, and the message originator was provided with no information as to why the paging user failed to respond to the message.

Concepts for storing voice messages have been proposed. However, messages stored and retrieved at some later time may no longer be applicable to the current situation. Ideally, if the originator were initially informed of the pager status (e.g., that the pager is in the deferred mode), the originator would be in a better position to decide to either proceed with the originally planned message, to change the contents of the message knowing that initially will not be immediately delivered, or abandon altogether. This flexibility significantly improves the utility of the system.

SUMMARY OF THE INVENTION

Accordingly, it is an object of the present invention to overcome the deficiencies of the prior art acknowledge back voice paging systems in improving the throughput for such systems.

It is a further object of the present invention to provide a means for guaranteeing message reception when the deferred paging mode is selected.

In general, there is shown a paging system for transferring information to a selected paging receiver. The system includes a central controller having a paging controller, an encoder, and a first transmitting device. The paging controller receives the information and data designating the paging the paging receiver from an entry device. The encoder, in response to the data, generates a selective call paging signal designating the paging receiver. The selective call paging signal is transmitted to the paging receiver by the first transmitting device. The paging receiver receives and decodes the selective call paging signal generating a control signal. A switching device is provided for selecting a normal and a deferred paging operating mode. In response to the control signal, a coded acknowledgment signal is generated indicating the selected paging receiver mode, and transmitted back to the paging controller by a second transmitting device included in the paging receiver. A second receiver receives and detects the coded acknowledgment signal and in response to decoding the coded acknowledgment signal, the paging controller effects the transmission of the information to the paging receiver, which is stored in a memory when the paging receiver is in the deferred paging mode. When the coded acknowledgment signal indicates the paging receiver memory is full in the deferred paging operating mode, the information is stored in the central controller for transmission at a later time.

BRIEF DESCRIPTION OF THE DRAWINGS

The foreground advantages and other features of the invention are explained in the following description, taken in conjunction with the accompanying drawings, wherein:

FIG. 3 is a block diagram showing the paging receiver for generating an acknowledge signal to the central controller.

FIG. 4 is a message timing diagram for a prior art signalling format previously used to alert the paging receiver.

FIG. 5A is a graphic representation of a timing diagram showing the relation between the "outbound" pages of the paging controller and the "inbound" acknowledgments of various system pagers.

FIGS. 5B-5E are graphic representations of the various responses provided when the paging receiver is in the deferred paging mode.

FIGS. 6A-D are flow diagrams for the central controller encoder/acknowledge back decoder.

DETAILED DESCRIPTION OF A PREFERRED EMBODIMENT

Figure 1:
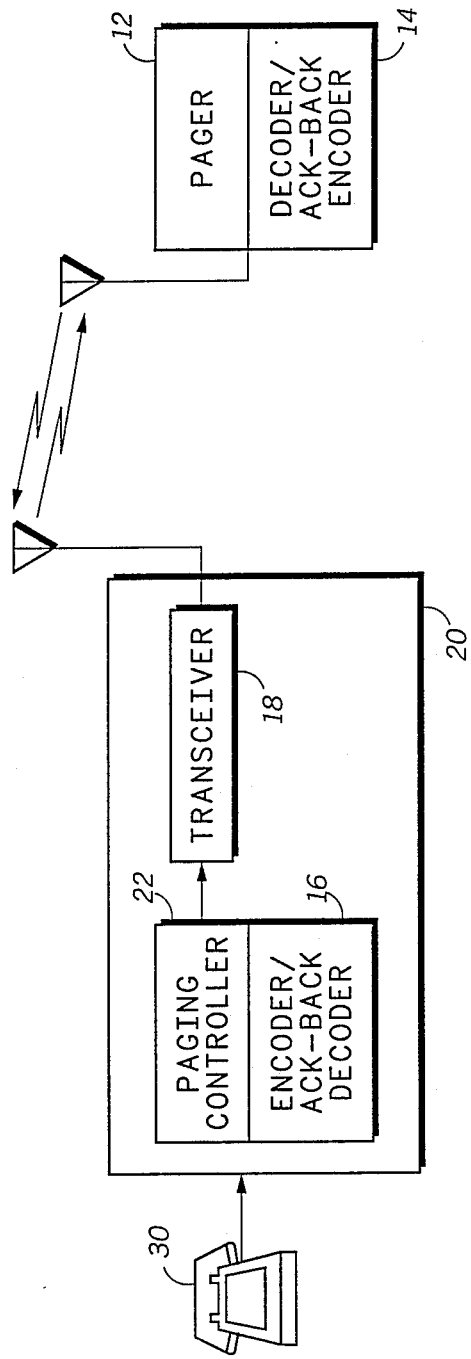
FIG. 1 is a block diagram showing a central controller operating in an acknowledge back environment.

In order to best illustrate the utility of the present invention, it is described in conjunction with an acknowledge back voice paging system capable of transmitting and receiving voice information to and from a selected paging receiver. While the present invention is described hereinafter with particular reference to a voice paging system, it is to be understood at the outset of the description which follows that it is contemplated the apparatus and method in accordance with the present invention may be used with numerous other communication systems, including, but not limited to, numeric and alphanumeric paging systems.

Referring now to the drawings, a radio communication paging system 10 is shown according to the present invention. The paging system 10 includes a central controller, shown generally as reference 20, and having at least one paging receiver or pager indicated as 12. It is understood that in practice, a plurality of paging receivers are associated with central controller 20. It is intended that an associated paging receiver be capable of providing an acknowledge back transmission upon receiving and recognizing its transmitted address. Paging receivers of this character are known to those of ordinary skill in the art and includes a receiver acknowledge back encoder 14 as indicated which is activated when paging receiver 12 receives and recognizes its particular address. A more detailed description will be set forth in connection with FIG. 3 for the paging receiver function and operation.

Continuing our discussion with reference to FIG. 1, central controller 20 is illustrated in greater detail as being comprised of a paging controller 22, a controller encoder/acknowledge back decoder 16, and a transceiver 18. An entry device 30 is connected to central controller 20 for transmitting information and data designating a paging receiver to the central controller from a message originator. Briefly, in operation, paging controller 22 receives data, such as a paging receiver ID and voice information from entry device 30, provides the information to controller encoder/acknowledge back decoder 16 for formatting into a composite paging signal having the format as that which will be discussed with reference to FIG. 4, and sends the beginning of the composite paging signal to transceiver 18 to be transmitted to paging receiver 12. Paging receiver 12 receives the information and decodes it with the decoder/ack-back encoder 14 to determine if the information is intended for the paging receiver. If the information is for the paging receiver, at a predetermined amount of time later, ack-back encoder 14 generates an acknowledgment signal corresponding to the status of the paging receiver and transmits the acknowledgment signal back to central controller 20 where it is decoded by controller acknowledge back decoder 16. After the acknowledgment signal is received by the central controller 20, the user may be prompted in a manner consistent for the pager status. When the status of the pager is determined to be normal, the originator is so notified and the voice message is delivered. If the pager status indicates the pager is in the deferred paging mode, the user is notified, and given the option to proceed with or cancel the message. If the originator elects to proceed, the message is transmitted for storage in the pager, or the message may be stored in the central controller for transmission at a later time, as will be described in detail later.

Figure 2:
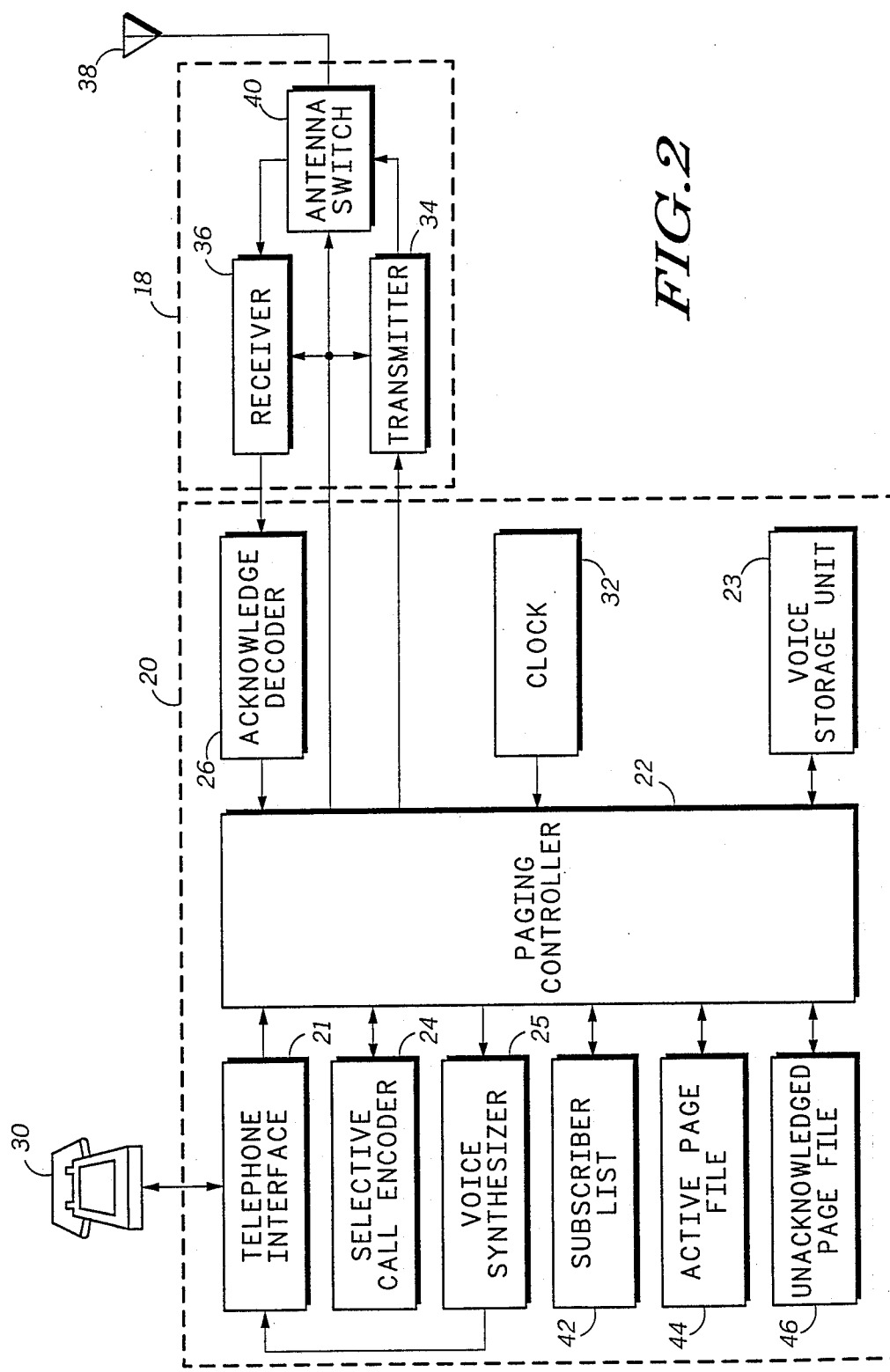
FIG. 2 is a detailed block diagram of the central controller.

Referring to FIG. 2, central controller 20 is illustrated in greater detail, together with associated auxiliary equipment. As shown, central controller 20 includes a paging controller 22 and controller encoder/acknowledge back decoder 16 is shown as selective call encoder 24 and acknowledge decoder 26. Paging controller 22 includes a microcomputer having a program memory (not shown) and being connected to a real time clock 32, a subscriber list 42, and a voice storage unit or means 23.

Entry device 30 is used to access paging controller 22 through telephone interface 21 to enter the paging receiver ID and voice messages intended therefore for subsequent transmission to the selected paging receiver. Entry device 30 as shown is a telephone which is useful for entering voice messages. The subscriber list 42 contains a list of all the paging receiver ID's that are valid in the system 10. Filed under each paging receiver ID in the subscriber list 42 are items that will be needed by paging controller 22 to send or transmit a voice message including pager type (acknowledge back or not acknowledge back), a particular pager address which corresponds to the pager ID, and other information necessary for the operation of the paging controller.

As may be appreciated, paging controller 22 is essentially the heart of system 10 and controls the operation of the other associated elements of central controller 20. In addition to the subscriber list 42, paging controller 22 also maintains an active page file 44 which comprises a temporary file containing information about the pages currently being processed by central controller 20. The active page file 44 includes the pager identification address, voice message location in the voice storage unit 23, and time. Further, an unacknowledged page file 46 is likewise maintained in which undeliverable messages are stored. Messages are undeliverable when a paging receiver fails to respond with an acknowledgment signal (and the originator elects to leave a message) or when the paging receiver message memory is filled with unread messages. The unacknowledged page file 46 includes the paging receiver ID, the pager address, the voice message, time of last transmission, and time of entry into the unacknowledged page file 46. A timing means, such as real time clock 32, is used to supply timing information to pager controller 22, for time stamping of undeliverable messages in the unacknowledged page file 46, and for initiating periodic retransmissions to the paging receiver to effect the delivery of the undeliverable messages.

Selective call encoder 24 generates selective call addresses corresponding to the pager identification number supplied to pager controller 22 by entry device 30. The selective call address is subsequently transmitted by transmitter 34 through antenna switch 40 to antenna 38 which radiates the signal energy to paging receiver 12. Under control of paging controller 22, antenna switch 40 controls information being transmitted through transmitter 34 and information being received by receiver 36. Depending on the coded acknowledgment signal received, paging controller 22 will cause any of a number of prompts to be generated by a voice prompting means, such as voice synthesizer 25, which are routed to entry device 30 through telephone interface 21. Prompts, such as "Pager out of service", "Pager in deferred mode" and "Pager memory full", inform the originator of the paging receiver status. Depending on the prompt received, the message originator may proceed with the original message or a modified message more appropriate to knowing the message may not be immediately responded to.

While transmitter 34 modulates an RF carrier frequency with outbound addresses and messages, receiver 36 demodulates the inbound modulated RF carrier frequency and supplies recovered data to acknowledge decoder 26. Acknowledge decoder 26 then detects and processes the coded acknowledgment signals returned from paging receiver 12 generating a message transmission control signal to paging controller 22. Paging controller 22 transmits the intended message when paging receiver 12 is in the normal operating mode of operation. If a coded acknowledgment signal is not received, the message intended for that particular paging receiver can, at the discretion of the originator, be stored in the unacknowledged page file 46 for later retransmission on a periodic basis. When stored, retransmission of that address continues on a periodic basis, such as at 5 minute intervals, until an acknowledgment signal indicating a message deliverable status is received, at which time the stored message is then transmitted, or when a predetermined time period expires, at which time the information in the unacknowledged page file 46 is purged.

The block diagram of the paging receiver 12 is shown in FIG. 3 and a flow diagram that describes its operation is illustrated with reference to FIGS. 6A–D. Paging receiver 12 with acknowledge back capability (hereinafter "ack-back") as illustrated includes a receiver section 50 and a transmitter section 52. RF signals are coupled to and from receiver and transmitter sections 50/52 via an antenna 54 and an antenna switch 56. Normally, ack-back pager 12 is operated in a receive mode and the demodulated data output 51 of the receiver section 50 is coupled to selective call decoder 58.

In operation, a decoding means, such as selective call decoder 58, examines the recovered data looking for a unique selective call signal or address that is assigned to ack-back pager 12. This unique address is a precursor for any voice messages that may be directed to the pager. Once the address has been detected, selective call decoder 58 generates a control signal which is supplied to a processing means, such as controller 60, in combination with acknowledge encoder 70. An alert tone is generated in the normal operating mode by alert tone generator 62 and routed to message delivery means 64 comprising audio amp 66 and speaker transducer 68.

Controller 60 provides a control signal 61 enabling the alert tone input to audio amp 66. This alert tone notifies the paging receiver user of an incoming voice message and provides the paging receiver user the opportunity to be ready to listen to the message. At the same time as the alert is being generated, controller 60 enables acknowledge encoder 70 to generate an appropriate pager automated acknowledgment signal including particular coded words identifying the pager status. Encoder 70 then keys transmitter 52 which is modulated with the acknowledgment signal. The output of transmitter 52 is coupled to antenna 54 through antenna switch 56 under control of controller 60 to be transmitted to and is received by paging controller 22 through receiver 36. Following the acknowledgment signal, ack-back pager 12 returns to its normal receive mode with controller 60 selecting receiver 50 input to be coupled to antenna 54 through antenna switch 56 and begins looking for a voice message. The particular coded words included in the acknowledgment signal indicate the status of the pager, as will become apparent shortly. Ack-back pager 12 functions are controlled by a switching means such as several switches for selecting a normal and a deferred paging operating mode, "deferred page" switch 74, a message playback means, and read/reset switch 76. In normal operation, the RF signals containing voice messages intended for ack-back pager 12 are intercepted by antenna 54 and coupled to receiver 50 through antenna switch 56. Receiver 50 detects and demodulates these RF signals providing a recovered voice message at receiver output 53. The voice message is routed to a memory means 78 for immediate storage as the message is received, and to bypass means 81 which is enabled by controller 60 after the address has been decoded by decoder 58, coupling the voice message to voice input 63 of message delivery means 64. Voice input 63 of audio amp 66 is enabled by controller 60 delivering the voice message to speaker 68, thereby providing the voice message as it is received.

Since the voice message is also stored in memory means 78, it may be recalled from the memory means by actuating "read/reset" switch 76. When this occurs, controller 60 disables bypass means 81 and enables memory means 78 to replay the stored message. The stored message is output to voice input 63 and delivered as previously described.

"deferred page" switch 74 allows the paging user to defer alerting on receipt of an address. When the "deferred page" operating mode is selected, the voice message is processed as previously described and stored in memory means 78. However, unlike the normal operating mode, controller 60 inhibits the enabling of alert tone generator 62 in response to decoding the address by selective call decoder 58, and further disables bypass means 81 inhibiting the delivery of the voice message to output means 64. The voice message stored in memory means 78 can be replayed by either exiting the "deferred page" operating mode or by actuating "read/reset" switch 76 which allows the voice message to be replayed without exiting the "deferred page" operating mode. When ack-back pager 12 is placed in the "deferred page" operating mode, controller 60 causes acknowledge encoder 70 to generate an acknowledgment signal including a coded word indicating the pager is in the "deferred page" mode. This allows a voice message originator to possibly modify the message before it is transmitted, as the originator knows the message will not be immediately delivered.

Memory means 78 comprises codec 80 and memory 82. The coder-decoder 80 (hereinafter referred to as Codec) provides for the digital-to-analog and analog-to-digital conversion of speech signals. The Codec 80, such as an adaptive delta modulator, can convert or encode an audio input signal to a digital data stream for storage and reconvert or decode a digital data stream to reconstruct an audio signal. In particular, Codec 80 monitors the real time audio signal on line 53 and compares it to a past value that is has reconstructed and generates a digital bit (sign) that indicates whether the reconstructed signal's voltage level is higher or lower than the present input value. The Codec 80 than tries to adapt the reconstructed signal voltage to mirror the present value at the audio input by varying or modulating a current. The current charges or discharges a capacitor (not shown) which changes the reconstructed signal's voltage. The digital output is the sign bit which indicates whether the reconstructed signal is behind the input or lower in voltage (logic "0") or ahead of the input or higher in voltage (logic "1"). The Codec's digital output is stored in memory 82 and retrieved to reconstruct a synthesized audio signal, thus closely replicating the real time audio signal in both amplitude and frequency. One example of such a coder-decoder is disclosed by N. S. Jayant in the publication "Adaptive Delta Modulation with One-Bit Memory", Bell System Journal, Vol. 49, No. 2, Mar. 1970. Codec 80 digitizes the voice message and stores the resultant digitized message in memory 82. In the preferred embodiment of the present invention, memory 82, which is a 256K bit CMOS DRAM, is capable of storing two 8-second voice messages digitized at a 32 KHz rate. It will be appreciated by one of ordinary skill in the art that additional messages could be stored if additional memory is available or if a lower bit rate digitizing algorithm is used. As messages are stored, the message is flagged as being read or unread. Messages received in the normal operating mode are always flagged as being read. Messages received in the "deferred page" operating mode are always flagged unread until the message is actually read, as by actuating "read/reset" switch 76 to allow replay of the stored message. It will be appreciated that if ack-back pager 12 is maintained in the "deferred page" operating mode for any length of time, it is likely to have memory 82 filled. When this occurs, a memory utilization means, such as a flag, is set whereby an acknowledgment signal including a coded word indicating "memory full" is generated by acknowledge encoder 70 in response to the flag being detected by controller 60 and the ack-back pager being addressed. This alerts the message originator that the intended message will not be immediately delivered but will be stored in central controller 20. As such, the message originator may again desire changing his message.

While only two paging receiver status conditions have been described, it will be appreciated by one of ordinary skill in the art that other paging receiver status indications may be generated which would affect the receipt and delivery of voice messages. It is noted that the information is not limited to those mentioned above but can be other information such as telemetry data as well.

Referring to FIG. 4, there is shown a voice message timing diagram for a prior art selective call signalling scheme such as for the Golay Sequential Code (GSC code). FIG. 4 in sequence shows a preamble 70 followed by a control word 72, address 74 used to select a paging receiver and an activation code 76. Upon receipt of activation code 76, the selected paging receiver goes into an alert time period for a predetermined amount of time to warn the paging receiver user that a voice message 78 is to follow. Following voice message 78, a deactivation code 80 notifies the paging receiver of the end of the voice message. It is important to note that for such tone and voice systems, no use has been made of the voice alert time period to transmit information back to the paging controller and the system controller is idle at this time with respect to transmitting messages.

Referring to FIG. 5A, there is shown a voice message timing diagram according to the present invention showing the advantages of an acknowledgment back signal being generated during the alert time for the activated paging receiver. The timing diagram of FIG. 5A illustrates the relationship between the "outbound" or selective call paging signal transmitted from paging controller 20 to the paging receiver 12 and the "inbound" or acknowledgment signal from paging receiver 12 to the paging controller. By way of example, in FIG. 5A, pager "1" immediately generates a first coded acknowledgment signal "ACK 1" after detecting its address followed by the activation code (CC). The coded acknowledgment signal is detected by the paging controller which, upon decoding the coded portion of "ACK 1", knows paging receiver is in the "normal" operating mode. Paging controller prompts the originator of the pager status and requests the originator to deliver the voice message intended for that paging receiver which is then transmitted by the paging controller shown as "message for pager 1", followed by the deactivation code. In contrast, paging receiver "2", for some reason, does not send back a coded acknowledgment signal and, consequently, the paging controller does not request to send any voice message while informing the message originator, as for example, the "paging receiver is not in service". If the originator so chooses, a message is stored in the unacknowledged page file 46. Continuing with our example, in FIG. 5, after the unsuccessful attempt to page paging receiver "2", a message is illustrated as being successfully sent to paging receiver "3". It should be noted that the paging controller can attempt to readdress paging receiver "2" which initially failed to acknowledge back in lieu of attempting to address paging receiver 3.

When the paging receiver is placed in the deferred paging operating mode, a second coded acknowledgment signal (ACK 2) indicates to the paging controller that the paging receiver is in the deferred paging operating mode as shown in FIG. 5B. The paging controller decodes this received coded acknowledgment signal (ACK 2) and may generate a voice prompt to the originator indicating the paging receiver is in the deferred paging operating mode. The originator may decide to send the originally intended message or a modified message which is then transmitted to the paging receiver. The paging receiver then stores the message as it is received in its message memory. When the paging receiver is taken out of the deferred paging operating mode, a short alert may be generated and the stored message is played.

It will be appreciated by one of ordinary skill in the art that more time may be needed than provided during the alert time interval to provide a voice prompt indicating the deferred status of the paging receiver and an originator response. Since the paging receiver is in the deferred paging operating mode and will not be immediately responding to the message, the paging controller may transmit other pages while the originator is notified of the paging receiver status. If a new message is entered, it will be stored by the paging controller which can then readdress the paging receiver at a later time and transmit the previously entered or revised message, as shown in FIG. 5C.

Figure 5D:
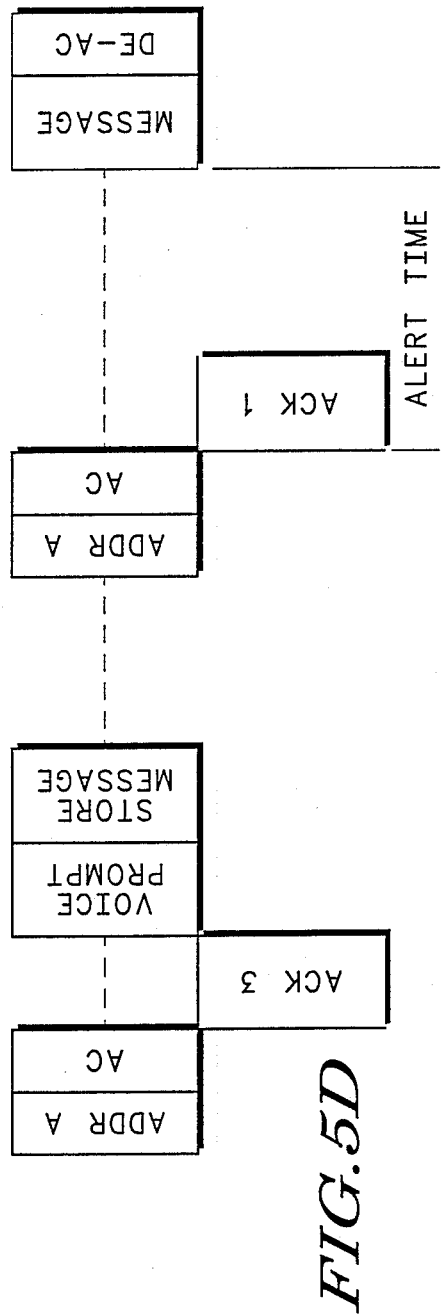
Figure 5E:
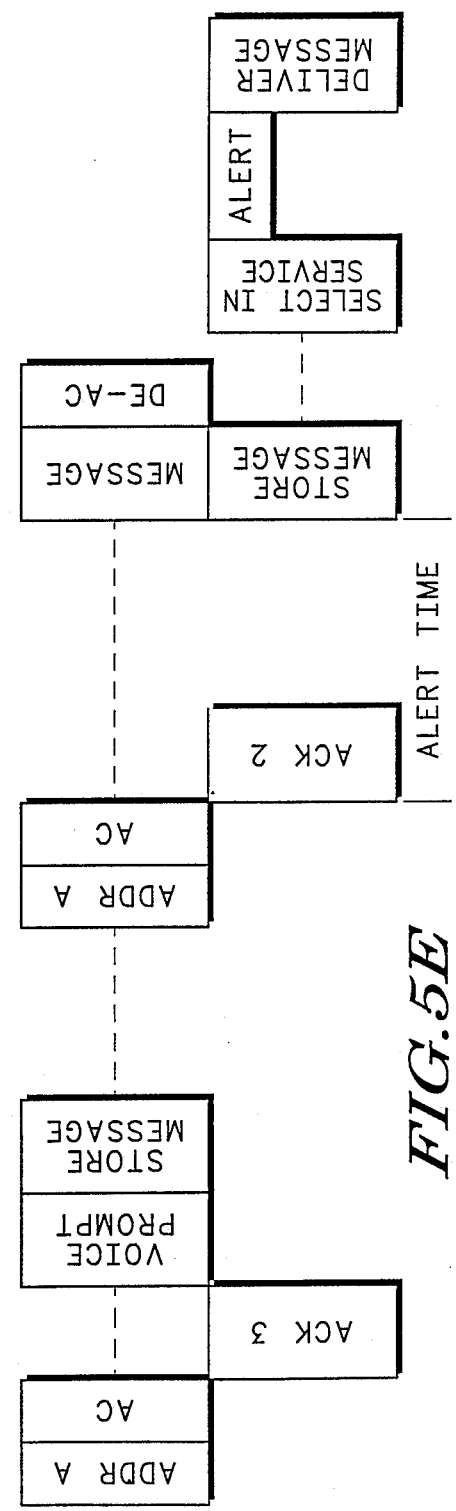

If the message memory were full (pager still in deferred paging operating mode), as shown in FIG. 5D, a third coded acknowledgment signal (ACK 3) would be decoded by the paging controller, prompting the message originator correspondingly. Processing of the originator's message may be done "off line", meaning other pages in queue may be delivered while the originator is determining the new response. The paging controller will then periodically address the paging receiver at time intervals, such as five minutes, attempting to deliver the message. When the paging controller decodes a coded acknowledgment signal indicating the paging receiver is "in service", as shown in FIG. 5D, or still in the deferred paging operating mode but with memory available, as shown in FIG. 5E, the message is transmitted.

The means and procedure for effecting the signalling procedure and sequence in terms of sending voice messages in an interleaved ack-back paging system, as illustrated and described in FIGS. 5A–5E, are effected within and by means of the paging controller 22 of central controller 20 as previously described. The procedure/protocol for accomplishing this is set forth with particularity in the flow diagrams comprising FIGS. 6A–6D. The operation begins with an initialization step 100 of FIG. 6A, normally needed only at power up. Step 100 is used to perform functions such as setting up the I/O ports as inputs and outputs, clearing certain memory locations, and perhaps running a self-diagnostic test.

After completing initial power up routine 100, the paging controller accesses the unacknowledged page file 46 to determine if it is time to attempt to deliver any unacknowledged pages. If there are no unacknowledged pages, the paging controller waits for a page request from an entry device, step 102. Eventually, a page request is detected signifying that a new page originator needs service, step 104. The paging controller then queries the entry device user for the paging receiver's ID and page type, step 106. If the page type is not in the subscriber list, the originator may respond by signifying one of existing page types in which existing encoder algorithms are used to process the page request, step 108. These processes are well known to those of ordinary skill in the art and are not presented here.

Referring back to step 106, if the originator signifies that this is an ack-back voice page type, the encoder is vectored to the ack-back voice page type routine. Voice messages may be handled in one of two ways, either real time wherein steps 110–114 are omitted, and "off line" wherein the voice message is stored prior to being processed. The discussion to follow will concentrate initially on real time message entry. The paging controller stores the paging receiver ID in the active page file, step 115. The active page file tracks all current pages to be transmitted. The encoder first determines from the subscriber list the pager address corresponding to the paging receiver's ID inputted earlier. The encoder then sends to the transmitter the preamble, control word, and address, step 116. The address is then followed by the activation code for the selected paging receiver, step 118. It is important to note that during this time, the paging controller has activated the antenna switch to insure that the information is transmitted through transmitter 34 through to antenna 38.

The encoder then starts an alert time out timer which corresponds to the voice alert time period for the selected paging receiver, step 120. For purposes of illustration, it is assumed that this voice alert time period is two seconds. The paging controller then clears an ack-back flag which is used as a condition to confirm an acknowledgment signal from the selected paging receiver, step 122. The paging controller then activates antenna switch 40 to cause paging controller 20 to receive radiated signals from the selected paging receiver through receiver 36, step 124.

Figure 6A:
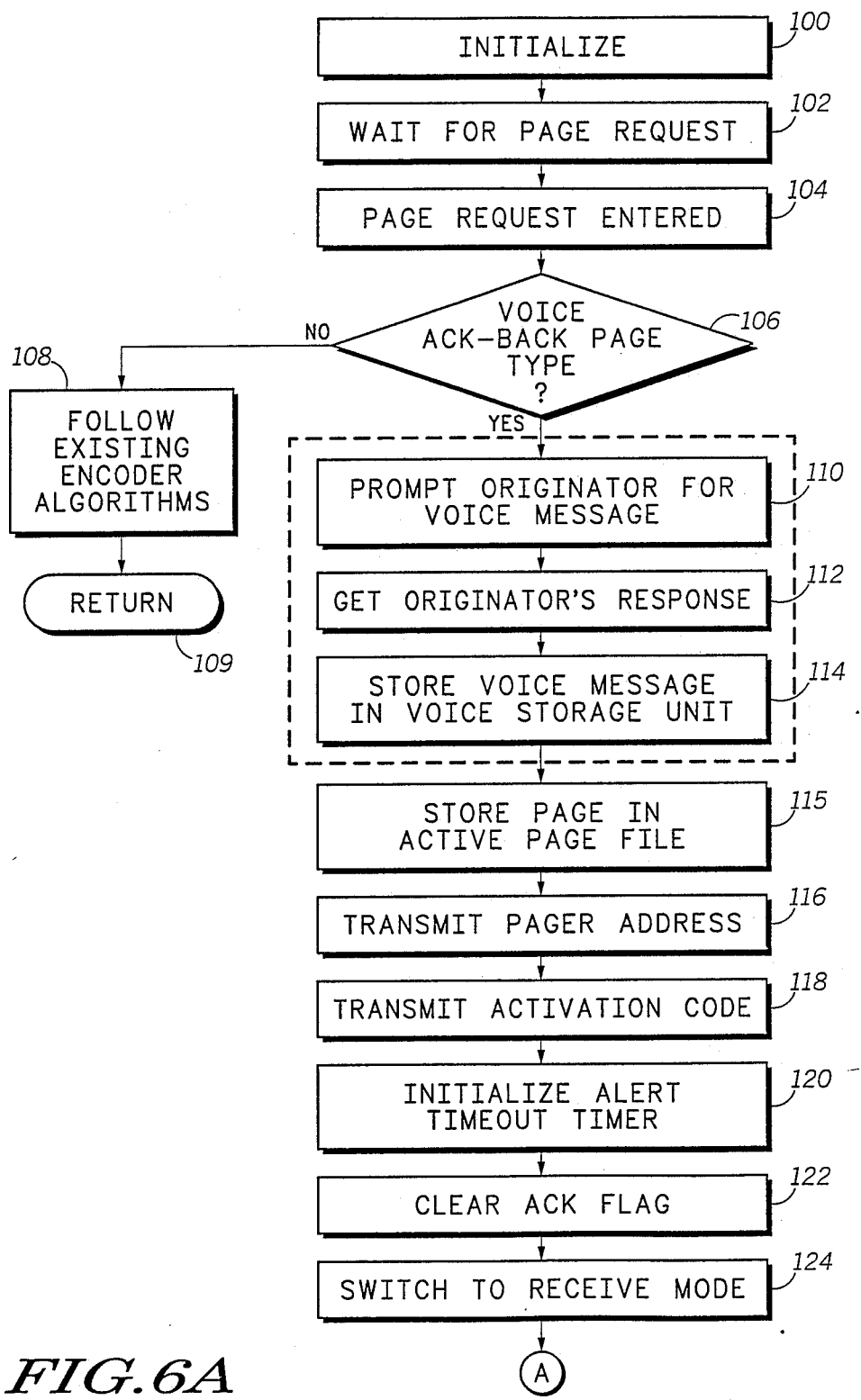
Figure 6B:
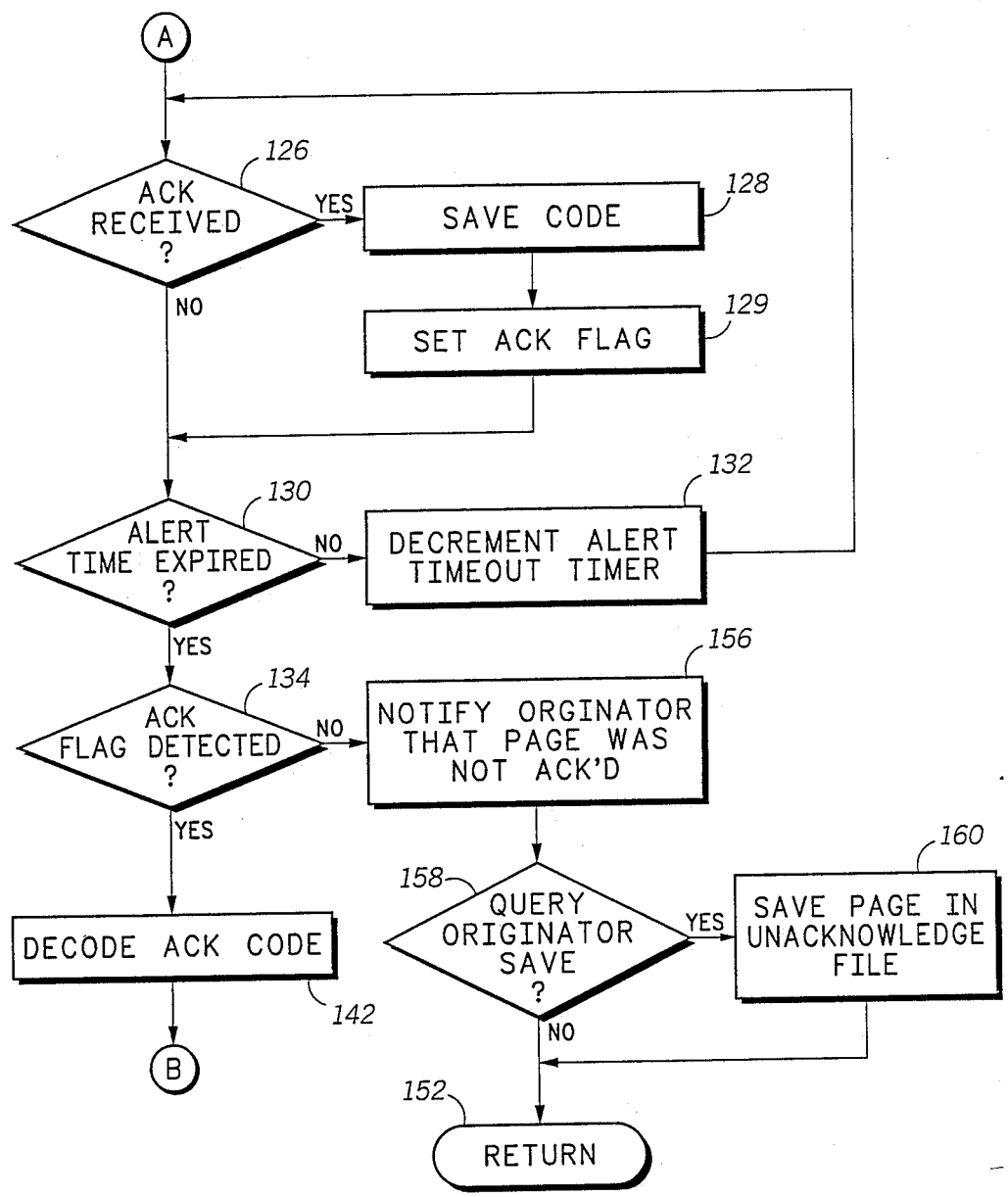

Continuing our discussion with reference to FIG. 6B, the paging controller then waits to see if the acknowledgment signal is received from the selected paging receiver, step 126. If an acknowledgment signal is detected, the paging controller saves the coded response, step 128. The paging controller then sets the ack-back flag, step 129. Referring back to step 126, if the acknowledgment signal is not received and the alert time has not expired, the paging controller decrements the alert time out timer, steps 130 and 132. If the paging receiver is in service, eventually an acknowledgment signal is received during the alert time out period, and the ack-back flag is set. If the paging receiver is not in service as by being turned off or out of range of the transmitter, the ack-back flag will not be set. This condition is determined by sensing the ack-back flag, step 134.

Referring back to step 134, if the ack-back flag is not detected, the originator is notified that the page was not acknowledged and the paging receiver is apparently not in service, step 156. The originator is then queried whether he wishes to leave a message and have the paging controller to continue to try and transmit the message or to cancel the sequence and allow the originator to try again at a later time, step 158. If the originator leaves a message, the message is stored in the unacknowledged page file, step 160, and then the system returns in a normal manner, step 152. If the originator signifies that he does not desire the paging controller to continue trying, the system returns in a normal manner, step 152. If the ack-back flag is detected, step 134, the paging controller decodes the ack-back code, step 142.

Referring to FIG. 6C, when an ACK 2 code is first detected, step 162, the originator is notified the pager is in the deferred paging mode, step 164. The paging controller prompts the originator for a message, step 178. The originator can then decide to proceed with the original message or a different message more appropriate to the status of the paging receiver. The originator delivers the message, step 180, which is stored in the voice storage unit, step 182, and the page is placed in the active page file, step 184, for delivery to the paging receiver. The system then returns in a normal manner, step 186. The system then returns in a normal manner, step 186.

When a second ACK 2 code is received corresponding to the second attempt to deliver the voice message to a particular paging receiver, step 165, the paging controller recalls the voice message from the voice storage unit for transmission to the paging receiver, step 172, followed by transmitting a deactivation code, step 174. The system then returns in a normal manner, step 176.

If an ACK 1 code is received, step 166, the originator is notified the pager is in service, step 168. The voice message is immediately transmitted following the alert time out, step 172, followed by a deactivation code, step 174, for terminating reception by the paging receiver receiving the message. The system then returns in a normal manner, step 176.

Figure 6D:
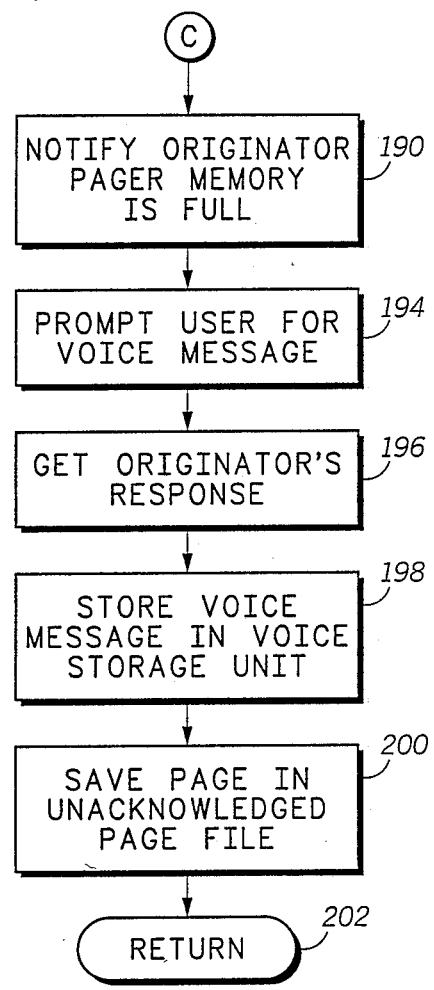

If a first ACK 3 code is received, step 188, from a paging receiver indicating it is in the deferred mode and the memory is full, the originator is notified, step 190 of the FIG. 6D. The paging controller prompts the originator as before if a different message should be sent, step 194.

The paging controller prompts the originator for the new voice message, step 194 of FIG. 6D. The originator can then decide to proceed with the original message or a different message more appropriate to the status of the paging receiver The originator delivers the message, step 196, which is saved in the voice storage unit, step 198. The page is also stored in the unacknowledged page file, step 200, for redelivery of the message at a later time. The system then returns in a normal fashion, step 202. The system periodically attempts to redeliver the voice messages from the unacknowledged pager file until a paging receiver in service code ACK 1 is received, in deferred paging mode memory available code, ACK 2, is received, or a predetermined message aging interval has been exceeded, such as 24 hours, at which time the voice message is erased from memory.

Referring now to FIGS. 7A-7D, there is shown a flow diagram for the paging receiver with the capability of receiving the voice message and generating an acknowledgment signal. Initially, the paging receiver is powered up and housekeeping techniques well known in the art are performed to initialize the buses and peripheral equipment connected to the microcomputer, step 200 of FIG. 7A. The microcomputer is then placed in a condition for the reception of selective call signals. Briefly, as is well known, the microcomputer samples the received data and correlates for a preamble detect. If the preamble is not detected, the paging receiver may be shut down for a predetermined amount of time if operating in a battery saving environment. If the preamble is detected, the microcomputer is instructed to correlate for the control word. If the control word is not detected within a predetermined time, this may indicate some type of fail condition and the microcomputer is instructed to look for a preamble or shut down for battery saving. Eventually, the preamble and code word are detected and the microcomputer decoder is instructed to correlate for address, step 202. If the address is not detected within a predetermined amount of time, the microcomputer is returned to the preamble detect state, step 204. Eventually, an address for the selected paging receiver is detected and is determined whether the address corresponds to the ack-back voice page type, step 206. If the address does not correspond to the ack-back voice page type, the microcomputer decoder follows existing decoder algorithms for decoding either voice, tone, or data which is well known to those of ordinary skill in the art, step 208.

Referring back to step 206, if the ack-back voice address is detected, the microcomputer decoder initializes an activation code window counter, step 210. The activation code window counter allows the decoder to search for the activation code for a predetermined period of time corresponding to the value used to initialize the window counter. The decoder then samples the received data correlated for the activation code, step 212. If the correlation is negative, the activation window counter is decremented, steps 214-216. If the window counter times out, this corresponds to a missed page or other problems and the paging receiver is returned to the initialize step, step 218. Referring back to step 218, if the window counter is not timed out, the decoder continues to sample the paging signal to correlate for the activation code, steps 212-218.

Referring back to step 214, eventually, the activation code is detected. If the paging receiver is in the deferred paging mode and the memory is full when the activation code is detected, step 244, of FIG. 7B, the paging receiver initializes the voice alert timer corresponding to the time period that an alert normally would be generated, step 246. However, because the paging receiver is in the deferred paging mode, generation of the alert is inhibited. During the alert time interval, an acknowledgment signal, ACK 3, is transmitted back to the paging controller, step 248, indicating the paging receiver is in the deferred paging mode and the message memory is full.

Returning to step 244, if the message memory was not full and the paging receiver is in the deferred paging mode when the activation code is detected, step 250, the voice alert timer is initialized, as previously described, step 252, and an acknowledgment signal, ACK 2, step 254, indicating the paging receiver is in the deferred paging mode and is capable of storing additional voice messages.

Returning to step 250, if the paging receiver was not in the deferred paging mode when the activation code is detected, the paging receiver initializes a voice alert timer corresponding to the time period that an alert is generated to notify the paging receiver user of the impending receipt of the voice message, step 220. This voice alert time period can typically be approximately two seconds. As the alert is generated, the decoder sends back an acknowledgment signal, ACK 1, to the paging controller to notify the paging controller that the paging receiver has detected an address and is in service at this time, step 222. The voice alert timer is then checked to determine whether the voice alert time period has expired, step 224. If voice alert time period has not expired, the voice alert timer is decremented, step 226. If the voice alert time period has not expired, the alert timer is rechecked, step 224.

Figure 7A:
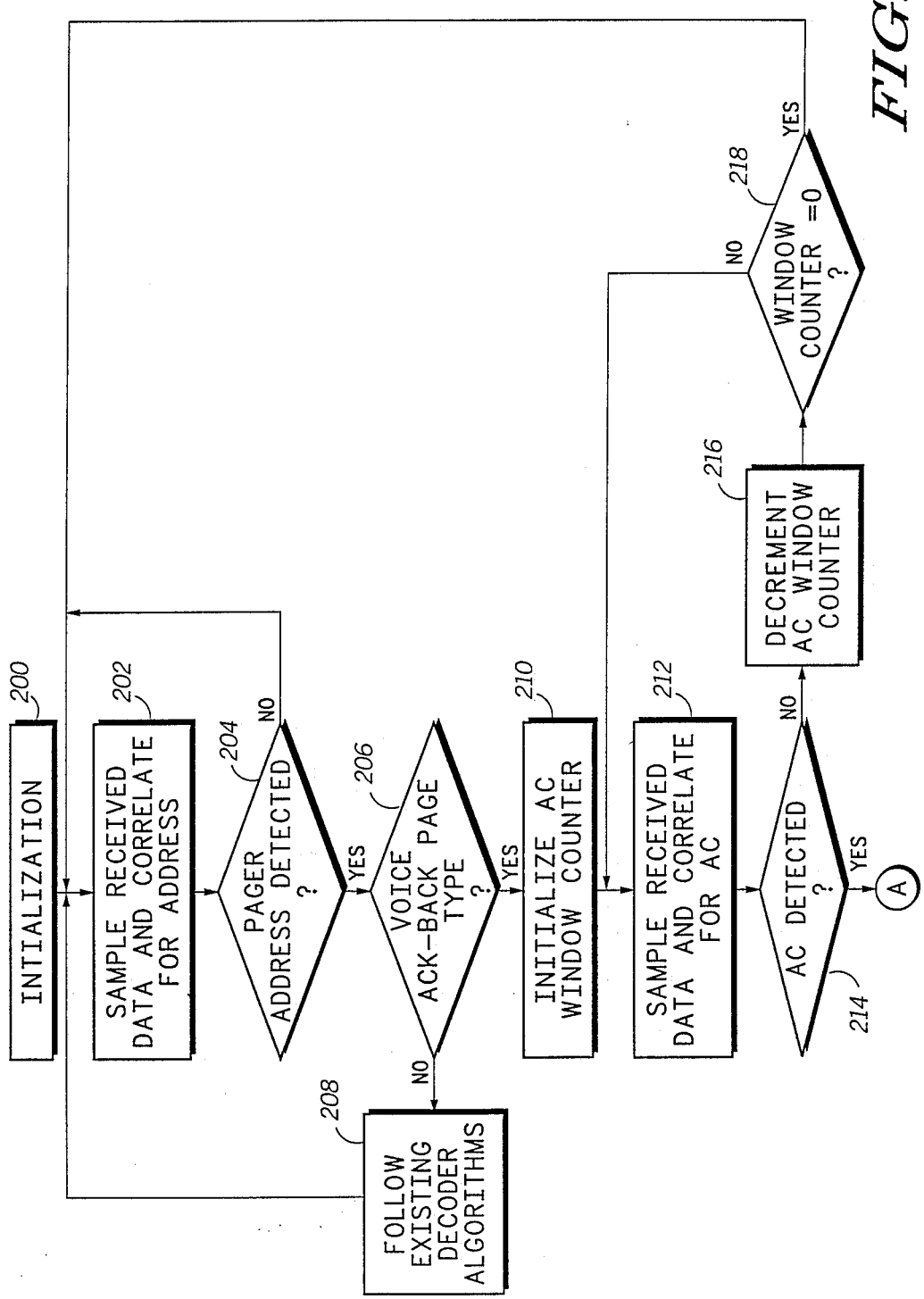
FIGS. 7A-D are flow diagrams for the address decoder/acknowledge back encoder.
Figure 7B:
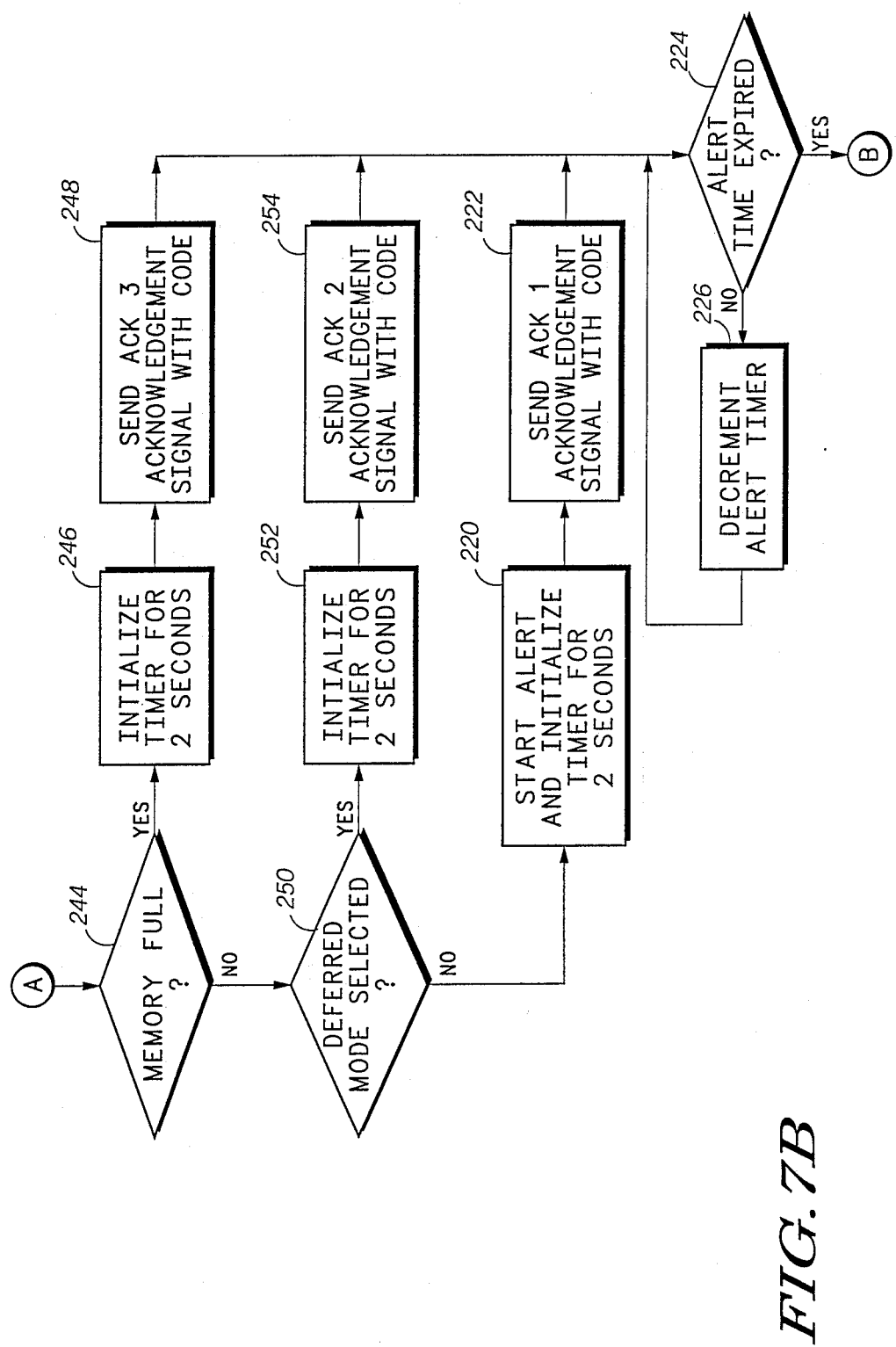
Figure 7C:
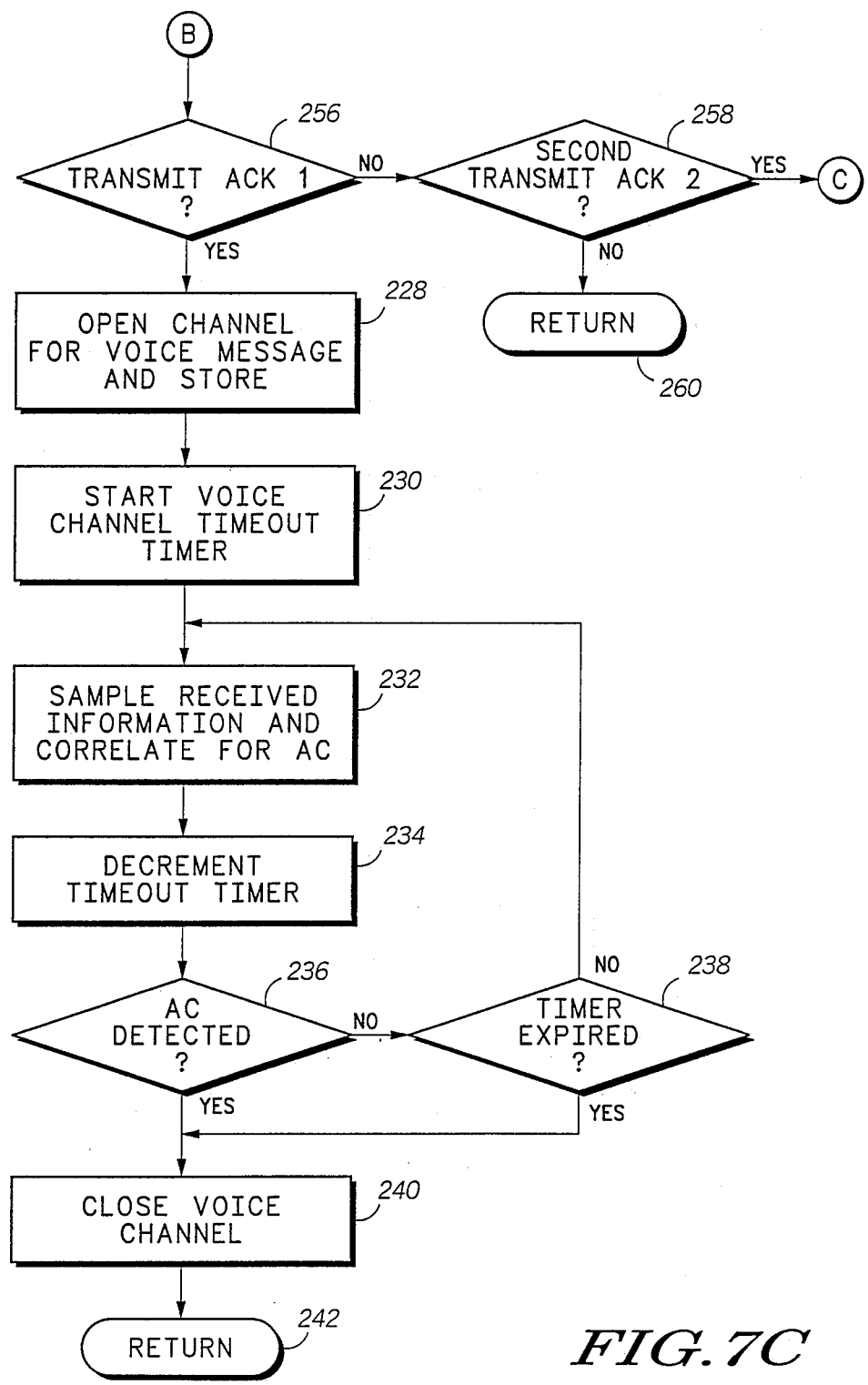

Referring back to step 224, of FIG. 7B, eventually, the alert time period expires. If the paging receiver responded with an in service, ACK 1, acknowledgment signal, step 256, of FIG. 7C, the audio channel on the paging receiver is opened for the impending voice message from the paging controller, step 228. A voice channel time out timer is then started to insure that if the deactivation code is not detected after the voice message, the voice channel is eventually shut down and the paging receiver is reset, step 230. The voice message is then provided to the paging receiver user as the decoder samples the voice message to detect the deactivation code, step 232. The voice channel time out timer is then decremented, step 234. It is then determined if the deactivation code has been detected, step 236. If the deactivation code is not detected and the voice channel time out timer has not expired, the channel remains open to provide the remainder of the voice message to the paging receiver user, step 238. If the deactivation code is detected or the voice channel time out timer expires, the voice channel is closed, step 240. The decoder then returns to the initialization state to await further paging information from the paging controller, step 242.

Returning to step 256, if the paging receiver was in the deferred mode and a second ACK 2 acknowledgment signal had not yet been transmitted, step 258, the decoder returns to the initialization state to await further paging information from the paging controller, step 260.

Figure 7D:
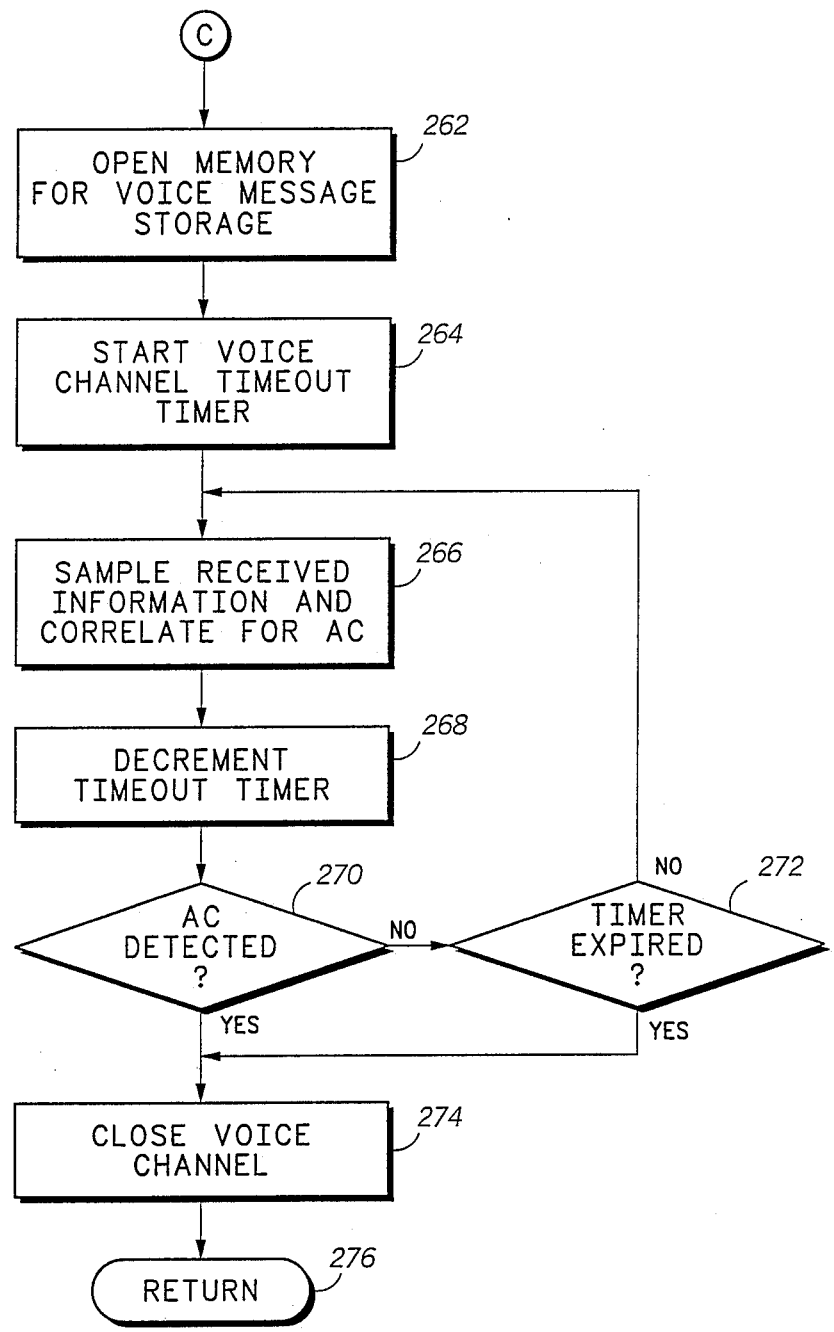

Returning to step 258, if the paging receiver responded a second time with an ACK 2 acknowledgment signal, the message memory is enabled to receive the impending voice message from the paging controller, step 262 of FIG. 7D. A voice channel time out timer is then started to insure that if the deactivation code is not detected after the voice message digitizing of the voice message and storage of the message in the message memory, the message memory is eventually terminated, step 264. The voice message is then stored in the message memory as the decoder samples the voice message to detect the deactivation code, step 266. The voice channel time out timer is then decremented, step 268. It is then determined if the deactivation code has been detected, step 270. If the deactivation code is not detected and the voice channel time out timer has not expired, the channel remains open to digitize and store the remainder of the voice message, step 272. If the deactivation code is detected or the voice channel time out timer expires, the digitizing and storing of the message is terminated, step 274. The decoder then returns to the initialization state to await further paging information from the paging controller, step 276.

The description of the preferred embodiment of the present invention described essentially real time entry of wherein messages being sent to paging receivers with acknowledge back capability. As previously described, "off line" entry of voice messages are also capable of being provided by a further embodiment of the present invention. This is accomplished as follows. Referring back to FIG. 6A, after it was determined the paging receiver being addressed had acknowledge back capability, step 106, the paging controller prompts the originator for a number to contact to deliver the response, such as that of the entry device wherein the message originates, and the message, step 110. The message originator delivers the message, step 112, and stores the message in a voice storage unit, step 114. Processing of the message is as previously described, with the following additional operational changes. In essentially real time processing as previously described, the originator was notified of the status of the paging receiver while still connected via the entry device to the central controller at step 156 of FIG. 6B and steps 164, 168, of FIG. 6C and 190 of FIG. 6D. When the message is delivered "off line", the originator has already disconnected with the central controller. Consequently, the central controller would contact the appropriate entry device by dialing the originator's phone number prior to each message in the active page file becoming ready for transmission. Once so contacted, the originator can decide to complete the message transmission as originally input, modify the message, or to cancel the message as previously described by FIGS. 6A through 6D.

Thus, there has been shown a method and a system for transmitting a voice message in an interleaved ack-back voice paging system having paging receivers capable of indicating their status as to being capable of receiving voice messages. According to the present invention, the paging receiver sends an acknowledgment signal encoded with the status back during the voice alert time period to notify the paging controller that the paging receiver is in service and ready to accept the voice message, is out of service, or is in the deferred paging mode and either capable of receiving and storing the voice message, or incapable of receiving and storing the voice message because the message memory is filled with unread messages.

While the preferred embodiment of the present invention has been described in detail, it should be apparent that many modifications and variations thereto are possible, all of which fall within the true spirit and scope of the invention defined by the appended claims.

What is claimed is:

1. A paging system for transferring information to a paging receiver, said system comprising:
   a central controller, including;
      a paging controller for receiving information and data designating the paging receiver from an entry device;
      an encoder responsive to the data for generating a selective call paging signal corresponding to the designated paging receiver;
      a first transmitting means, being responsive to said encoder, for transmitting the selective call paging signal to the paging receiver;
   the paging receiver, including;
      a first receiving means for receiving the selective call paging signal;
      a decoding means, being responsive to said first receiving means, for decoding the selective call paging signal and generating a control signal in response thereto;
      switching means for selecting a normal and a deferred paging operating mode and generating a mode signal in response thereof;
      processing means, being responsive to the control signal and to said mode signal, for generating a coded acknowledgment signal indicating the designated paging receiver operating mode;
      a second transmitting means included in the paging receiver for transmitting to the central controller the coded acknowledgment signal; and
      memory means, coupled to said first receiving means and responsive to said processing means, for storing the received information;
   said central controller, further including;
      a second receiving means for receiving the coded acknowledgment signal indicating the operating mode of the designated paging receiver;
      a coded acknowledgment signal decoder, coupled to said second receiving means, for decoding the coded acknowledgment signal and for generating a message transmission control signal in response thereto, wherein said paging controller is responsive to said message transmission control signal for effecting the transmission of the information to the designated paging receiver, whereby the transmitted information is stored in said memory means when the deferred paging operating mode is selected.

2. The paging system of claim 1, wherein the coded acknowledgment signal includes a first or a second coded acknowledgment signal and wherein said paging controller is responsive to each for effecting the transmission of the information when each is decoded.

3. The paging system of claim 2, wherein said processing means generates the first coded acknowledgment signal when said normal paging operating mode is selected, and further generates the second coded acknowledgment signal when said deferred paging operating mode is selected.

4. The paging system of claim 1, wherein said memory means further includes memory utilization means, and wherein said processing means is responsive to said memory utilization means for generating a third coded acknowledgment signal in response to said memory being full.

5. The paging system of claim 4, wherein said central controller further comprising a message storage means coupled to said paging controller, wherein said paging controller is responsive to the third coded acknowledgment signal being decoded for effecting the storage of the information in said message storage means.

6. The paging system of claim 4, wherein said central controller further including timing means generating timing signals coupled to said paging controller, wherein said paging controller is responsive to said timing signals for effecting the transmission of the information to the designated paging receiver when the received coded acknowledgment signal indicates storage in said paging receiver memory means is available.

7. The paging system of claim 1 wherein the information transmitted is voice information.

8. The paging system of claim 1 wherein the information transmitted is numeric and alphanumeric data.

9. The paging system of claim 1, wherein said central controller further comprising voice prompting means, coupled to said paging controller and responsive to the received coded acknowledgment signal, for generating a voice prompt indicating the operating mode of the designated receiver to the entry device.

10. A central controller for transferring information to a paging receiver which is capable of generating a coded acknowledgement signal indicating the operating mode of the paging receiver in response to receiving a selective call paging signal, said central controller comprising:
 a paging controller for receiving information data designating the paging receiver from an entry device;
 an encoder responsive to the data for generating the selective call paging signal designating the paging receiver;
 a transmitter, being responsive to said encoder, for transmitting the selective call paging signal to the paging receiver;
 a receiver for receiving the coded acknowledgement signal indicating the operating mode of the designated paging receiver;
 a coded acknowledgement signal decoder, coupled to said receiver, for decoding the coded acknowledgement signal and for generating a message transmission control signal in response thereto, wherein said paging controller is responsive to said transmission control signal for effecting the transmission of the information to the designated paging receiver; and
 voice prompting means, coupled to said paging controller and responsive to the received coded acknowledgment signal, for generating a voice prompt indicating the operating mode of the designated receiver to the entry device.

11. The central controller of claim 10, wherein the coded acknowledgment signal includes a first or a second coded acknowledgment signal and wherein said paging controller is responsive to each for effecting the transmission of the information when each is decoded.

12. The central controller of claim 10, wherein said coded acknowledgment signal further includes a third coded acknowledgment signal, and wherein the central controller further comprises a message storage means coupled to said paging controller, wherein said paging controller is responsive to the third coded acknowledgment signal being decoded for effecting the storage of the information in said message storage means.

13. The central controller of claim 10, wherein the information transmitted is voice information.

14. The central controller of claim 10, wherein the information transmitted is numeric and alphanumeric data.

15. A paging receiver for receiving a selective call paging signal and information intended for the paging receiver being transmitted from a central controller, said paging receiver comprising:
 a receiving means for receiving the selective call paging signal;
 a decoding means, being responsive to said receiving means, for decoding the selective call paging signal and generating a control signal in response thereto;
 switching means for selecting a normal and a deferred paging operating mode and generating a mode signal in response thereof;
 processing means, being responsive to the control signal and to said mode signal, for generating a coded acknowledgment signal indicating the designated paging receiver operating mode;
 transmitting means included in the paging receiver for transmitting to the central controller the coded acknowledgment signal; and
 memory means coupled to said receiving means and responsive to said processing means, for storing the received information when the deferred paging operating mode is selected.

16. The paging receiver of claim 15, wherein the acknowledgment signal includes a first or a second coded acknowledgment signal and wherein said paging controller is responsive for effecting the transmission of the information when each is decoded.

17. The paging receiver of claim 16, wherein said processing means generates the first coded acknowledgment signal when said normal paging receiver operating mode is selected, and further generates the second coded acknowledgment signal when said deferred paging operating mode is selected.

18. The paging receiver of claim 15, wherein the information received is voice information.

19. The paging receiver of claim 15, wherein the information received is numeric and alphanumeric data.

20. The paging receiver of claim 15, wherein said memory means is comprised of:
 a codec, coupled to said receiving means and responsive to said processing means, for encoding the received voice information into a digital format for storage, said codec further for decoding the stored digitized voice message into voice information; and
 a memory, coupled to said codec for storing the digitized voice information.

21. The paging receiver of claim 20, wherein said memory means further includes memory utilization means, and wherein said processing means is responsive to said memory utilization means for generating a third coded acknowledgment signal in response to said memory being full.

22. The paging receiver of claim 20, further comprising:
  message playback means for effecting the recovery of the stored digitized voice information from said memory means; and
  message delivery means, coupled to said memory means, for delivering the recovered voice information.

23. A paging receiver for receiving a selective call paging signal and information intended for the pagint receiver being tranmitted from a controller, said paging receiver comprising:
  a receiving means for receiving the selective call paging signal;
  a decoding means, being responsive to said receiving means, for decoding the selective call paging signal and generating a control signal in response thereto;
  switching means for selecting a normal and a deferred paging operating mode and generating a mode signal in response thereof;
  processing means, being responsive to the control signal for generating a coded acknowledgment signal indicating the designated paging receiver operating mode;
  memory means, coupled to said processing means, for storing the received information when the deferred paging operating mode is selected; and
  transmitting means included in the paging receiver for transmitting to the central controller the coded acknowledgment signal.

24. The paging receiver of claim 23, wherein the acknowledgment signal includes a first or a second coded acknowledgment signal and wherein said central controller is responsive for effecting the transmission of the information when each is decoded.

25. The paging receiver of claim 24, wherein said processing means generates the first coded acknowledgment signal when said normal paging receiver operating mode is selected, and further generates the second coded acknowledgment signal when said deferred paging operating mode is selected.

26. The paging receiver of claim 23, wherein the information received is voice information, and wherein said memory means is comprised of:
  a codec, coupled to said receiving means and responsive to said processing means, for encoding the received voice information into a digital format for storage, said codec further for decoding the stored digitized voice message into voice information; and
  a memory, coupled to said codec for storing the digitized voice information.

27. The paging receiver of claim 23, wherein the information received is numeric and alphanumeric data.

28. A method for transferring information entered from an entry device coupled to a central controller to a paging receiver having selectable normal and deferred paging operating modes and memory means for storing the information, said method comprising the steps of:
  transmitting, from the central controller, a selective call paging signal designating the paging receiver to which the information is intended;
  generating a coded acknowledgment signal indicating the paging receiver operating mode, and the memory availability, in response to receiving and decoding the selective call paging signal;
  transmitting the coded acknowledgment signal to the central controller; and
  decoding the coded acknowledgment signal and processing the information in accordance thereto.

29. The method of claim 28, said method further comprising the step of transmitting the information from the central controller when said step of decoding the coded acknowledgment signal indicates the paging receiver is in the normal operating mode.

30. The method of claim 28, said method further comprising the step of transmitting the information from the central controller when said step of decoding the coded acknowledgment signal indicates the paging receiver is in the deferred paging operating mode with memory available.

31. The method of claim 28, said method further comprising the steps of:
  storing the information in the central controller when said step of decoding the coded acknowledgment signal indicates the paging receiver is in the deferred paging operating mode and memory is unavailable;
  periodically transmitting the selective call paging signal until a coded acknowledgment signal providing a memory available indication is received; and
  transmitting the information from the central controller.

* * * * *